April 22, 1924.

G. M. BARTLETT

FLEXIBLE SHAFT COUPLING

Filed Sept. 14, 1921

1,491,186

Inventor
George M. Bartlett,
By Hood & Sihley
Attorneys

Patented Apr. 22, 1924.

1,491,186

UNITED STATES PATENT OFFICE.

GEORGE M. BARTLETT, OF INDIANAPOLIS, INDIANA.

FLEXIBLE SHAFT COUPLING.

Application filed September 14, 1921. Serial No. 500,504.

*To all whom it may concern:*

Be it known that I, GEORGE M. BARTLETT, a citizen of the United States, residing at Indianapolis, in the county of Marion and State of Indiana, have invented a new and useful Flexible Shaft Coupling, of which the following is a specification.

It is the object of my invention to provide a universal shaft-coupling which is simple in construction and inexpensive in manufacture, and which transmits rotary motion between two shafts with a continuously equal angular velocity of the driving and driven shafts even though the axes of the two shafts are offset or angularly disposed with respect to each other within the limits of the device.

The present invention is a simplification of the universal joint shown in my prior Patent No. 1,184,915, granted May 30, 1916, for use where the angle or the offsetting between the two shafts to be coupled is comparatively small; and embodies the generic invention of such prior patent.

Figure 1:
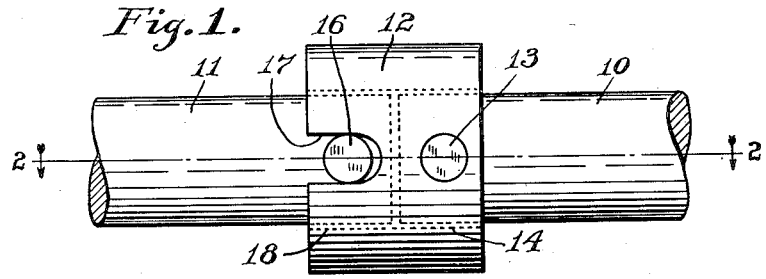
Figure 2:
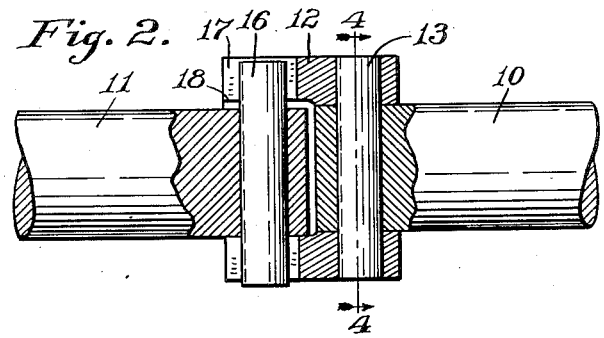
Figure 3:
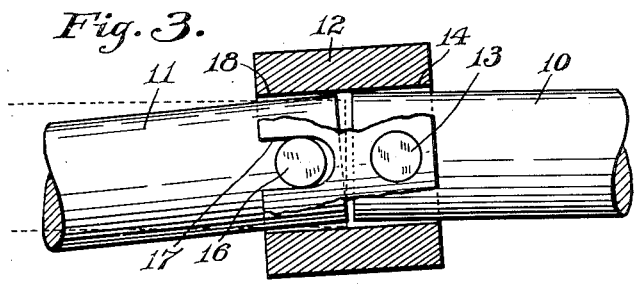
Figure 4:
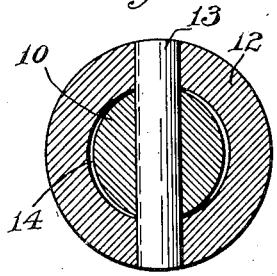
Figure 5:
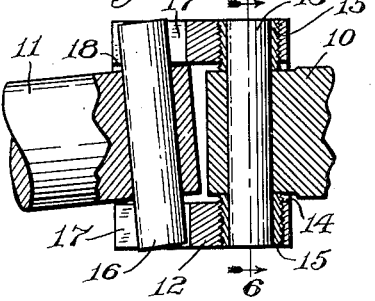
Figure 6:
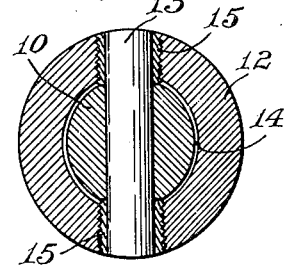

The accompanying drawing illustrates my invention: Fig. 1 is a plan view of a shaft-coupling embodying my invention, with the two coupled shaft-ends in alinement; Fig. 2 is a longitudinal section on the line 2—2 of Fig. 1, with the two shaft-ends partly in elevation, and with one of the shaft ends offset with relation to the other; Fig. 3 is a view similar to Fig. 1, with the coupling proper in section, and with the two shaft-ends at an angle to each other, also indicating in dotted lines the condition with the two shaft ends relatively offset; Fig. 4 is a transverse section on the line 4—4 of Fig. 2; Fig. 5 is a view similar to Fig 2, with the two shaft ends at an angle to each other instead of being relatively offset, and with a slightly modified arrangement for holding the coupling from transverse bodily movement with respect to one of the shaft ends along the line of their interconnecting pivot pin; and Fig. 6 is a section on the line 6—6 of Fig. 5.

The two shaft ends 10 and 11 have their adjacent ends slightly spaced apart, and project into opposite ends of a coupling ring 12. The coupling ring 12 preferably has a pure pivotal connection to one of the shaft ends, here the shaft end 10, by a transverse pivot pin 13, which has a pivotal fit within both the shaft end 10 and the coupling ring 12, though it may be fixed in one of them. The coupling ring 12 is free to turn within relatively small limits on the pivot pin 13 with relation to the shaft end 10, but is preferably held against sliding along the pivot pin 13 with relation to the shaft-end 10, to prevent rattle. For this purpose, the bore 14 of the coupling ring 12 is larger than the diameter of the shaft-end 10 in the plane at right angles to that of the pivot pin 13, as is clear from Figs. 1, 3, 4, and 6, but either the coupling 12 itself (as shown in Figs. 2 and 4) or an adjustable screw-bushing 15 bears against the surface of the shaft-end 10 around each end of the pivot pin 13. In the former case, shown in Fig. 4, the bore 14 of the ring 12 may be elliptical, with its minor axis coincident with the axis of the pivot pin 13; while in the latter case, shown in Fig. 6, the bore 14 may be circular, of larger diameter than the shaft-end 10, the screw-bushing 15 preventing relative movement between the shaft-end 10 and the coupling ring 12 along the axis of the pivot pin 13.

The other shaft-end, here the shaft-end 11, is connected to the coupling ring 12 by a combined pivotal and sliding connection, thus permitting both rotation and translation of one part relatively to the other. In the simple form shown, this consists of a tranverse pin 16 which is fixed in the shaft-end 11 with its ends projecting laterally into longitudinal slots 17 in the opposite end of the coupling ring 12 from that which carries the pivot pin 13. The pin 16 has a sliding fit in the slots 17. The bore 18 in that end of the coupling ring 12 which receives the shaft-end 11 is of larger diameter throughout than is such shaft-end. This permits such shaft-end 11 to tilt in any direction in the coupling ring 12, and to slide laterally therein along the axis of the pin 16 within the limits of the difference between the diameter of such shaft-end and the bore 18. The slots 17 extend axially of the coupling ring 12, and lie in the same plane or approximately in the same plane through the axis of such coupling ring.

In operation, the coupling ring 12 oscillates on the axis of the pins 13 and 16 if the two shaft-ends 11 are out of alinement, as by being relatively offset as shown in Fig. 2, or by being at an angle to each other as shown in Figs. 3 and 5. In addition to such oscillation about such two axes, the pin 16 also has a swinging oscillation lengthwise of the slots 17. The pins 13 and 16 and the surfaces with which they cooperate in the coupling ring 12 are of course hardened to withstand wear. The slots 17 also permit relative axial movement between the two shaft-ends. As a result of the oscillations above referred to, one shaft-end can drive the other through the coupling ring 12, with the angular velocity of the two shaft-ends always the same, and with the shaft-ends either in alinement, offset from each other, or at an angle to each other.

I claim as my invention:

1. In combination, two shaft-ends, a coupling ring connected to one of such shaft-ends on a single transverse pivot pin so that it may oscillate on such pivot pin, said coupling and said shaft-end being associated on such transverse pivot pin so that they are held from relative movement along the axis of such pivot pin, and a second transverse pin interconnecting said second shaft-end and said coupling ring and associated with one of such members in longitudinal slots therein, said two transverse pins and said slots lying approximately in the same plane extending through the axis of said coupling ring, and the second shaft-end and said coupling ring being relatively movable along the axis of said second transverse pin.

2. In combination, two shaft-ends, a coupling ring connected to one of such shaft-ends on a single transverse pivot pin so that it may oscillate on such pivot pin, and a second single transverse pin interconnecting said second shaft-end and said coupling ring and associated with one of such members in longitudinal slots therein, said two transverse pins and said slots lying approximately in the same plane extending through the axis of said coupling ring, and the second shaft-end and said coupling ring being relatively movable along the axis of said second transverse pin.

3. In combination, two shaft-ends, a coupling ring connected to one of such shaft-ends on a single transverse pivot pin so that it may oscillate on such pivot pin, said coupling and said shaft-end being associated on such transverse pivot pin so that they are held from relative movement along the axis of such pivot pin, and a second single transverse pin fixed in the second shaft-end and having projecting ends which lie in longitudinal slots in said coupling ring, said two transverse pins and said longitudinal slots all being approximately in the same plane through the axis of said coupling ring.

4. In combination, two shaft-ends, a coupling ring connected to one of such shaft-ends on a single transverse pivot pin so that it may oscillate on such pivot pin, and a second single transverse pin fixed in the second shaft-end and having projecting ends which lie in longitudinal slots in said coupling ring, said two transverse pins and said longitudinal slots all being approximately in the same plane through the axis of said coupling ring.

5. In combination, two shaft-ends, a member associated with one of said shaft-ends so that it can pivot thereon on an axis transverse to the axis of said shaft end, said member being provided with longitudinal slots, and a pin whose axis is transverse to the axis of the other shaft end, said pin projecting into said longitudinal slots, the transverse pivotal axis of said member with said first shaft end being approximately in the same plane through the longitudinal axis of said member in which lie said transverse pin and said longitudinal slots.

6. In combination, two shaft-ends, a coupling ring pivoted to one of said shaft-ends on a single transverse pivot pin so that it may oscillate on such pivot pin, and a second single transverse pin interconnecting said second shaft-end and said coupling ring and associated with one of such members in longitudinal slots therein, and the second shaft-end and said coupling ring being relatively movable along the axis of said second transverse pin.

7. In combination, two shaft-ends, a member associated with and interconnecting said two shaft-ends, said member being connected to each of said shaft-ends so that it can pivot thereon on an axis transverse to the axis of said shaft-end, the connection between at least one of said shaft-ends and said member including longitudinal slots in one of said parts and projections extending into said slots from the other of said parts so that there can be a relative sliding movement as well as a pivotal movement, said longitudinal slots and the transverse pivotal axes of said member with said two shaft-ends all being approximately in the same plane through the longitudinal axis of said member.

8. In combination, two shaft-ends, a member associated with and interconnecting said two shaft-ends, said member being connected to each of said shaft-ends so that it can pivot thereon on an axis transverse to the axis of said shaft-end, the connection between one of said shaft-ends and said member including longitudinal slots in one of said parts, and projections extending into said slots from the other of said parts so that there can be a relative sliding movement as well as a pivotal movement, the connection between said member and the other shaft-end being limited to a pivotal connection.

9. In combination, two shaft ends, and a coupling member pivotally joined to both shaft ends, the joints between the coupling member and the two shaft ends including two cylindrically extending convex surfaces having axes which lie in the same longitudinal plane of the coupling member, one of said surfaces being at each joint, said joints also including a slot receiving such a cylindrical surface and having plane walls parallel to the axis of the cylindrical surface which it receives.

10. In combination, two shaft-ends, and a coupling member pivotally joined to both shaft ends, the joint between said coupling member and one of said shaft ends containing an axis which is fixed relatively to one of such parts but is both rotatable and translatable in a longitudinal plane of the other of such parts, and the joint between said coupling member and the other of said shaft ends containing an axis which is always co-planar with the aforesaid axis between the coupling member and the first shaft end.

In witness whereof, I have hereunto set my hand at Indianapolis, Indiana, this 1st day of September, A. D. one thousand nine hundred and twenty one.

GEORGE M. BARTLETT.